US006295083B1

(12) United States Patent
Kuhn

(10) Patent No.: US 6,295,083 B1
(45) Date of Patent: Sep. 25, 2001

(54) HIGH PRECISION IMAGE ALIGNMENT DETECTION

(75) Inventor: Alexander Kuhn, Hillsboro, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/032,640

(22) Filed: Feb. 27, 1998

(51) Int. Cl.$^7$ ................................................. H04N 17/00
(52) U.S. Cl. ........................... 348/190; 348/180; 348/181; 348/189; 348/263; 382/294; 382/151
(58) Field of Search .................................. 348/180, 181, 348/185, 189, 190, 192, 461, 473, 263, 806, 807, 745, 746, 747, 658; 382/294, 151; H04N 17/00

(56) References Cited

U.S. PATENT DOCUMENTS

| | | | | |
|---|---|---|---|---|
| 5,020,116 | * | 5/1991 | Macaulay | 382/162 |
| 5,446,492 | * | 8/1995 | Wolf et al. | 348/192 |
| 5,453,840 | * | 9/1995 | Parker et al. | 356/400 |
| 5,475,428 | * | 12/1995 | Hintz et al. | 348/263 |
| 5,499,050 | * | 3/1996 | Baldes et al. | 348/180 |
| 5,548,326 | * | 8/1996 | Michael | 348/87 |
| 5,602,586 | * | 2/1997 | Schauer et al. | 348/189 |
| 5,793,887 | * | 8/1998 | Zlotnick | 382/209 |
| 5,818,520 | * | 10/1998 | Janko et al. | 348/192 |
| 5,987,191 | * | 11/1999 | Suzuki | 382/294 |
| 6,009,212 | * | 12/1999 | Miller et al. | 382/294 |
| 6,072,544 | * | 6/2000 | Gleim et al. | 348/745 |

OTHER PUBLICATIONS

G. Beakley, C. Cressy, J. Van Pelt, "Video Compression: The Need for Testing", SMPTE Journal, Nov. 1995, vol. 104, No. 11, White Plains, NY.

* cited by examiner

Primary Examiner—Reinhard J. Eisenzopf
Assistant Examiner—Jean W. Desir
(74) Attorney, Agent, or Firm—Francis I. Gray

(57) ABSTRACT

High precision image alignment detection uses an iterative part pixel shift detection algorithm to accurately determine the displacement of a received image with respect to a reference image. An alignment pattern is inserted into the original image and a portion of the alignment pattern, such as a single line, also is stored as a reference image. Using cross-correlation the received image is compared with the reference image to locate the alignment pattern, and selected portions of the received image alignment pattern are then used in conjunction with the reference image to determine the total pixel shift of the received image. An integer pixel shift is determined by cross-correlation of the received alignment pattern with the reference image. Using the integer pixel shift to identify a starting point, data is extracted from the received alignment pattern about a specific feature and a part pixel shift is measured. The received alignment pattern is then shifted by the part pixel shift, the data is again extracted and an additional part pixel shift is measured. These steps are iterated, using the sum of all prior part pixel shifts for each subsequent shift. At completion the total of the integer pixel shift value and all the part pixel shift values determines the pixel shift required for registration of the received image vis a vis the original image.

6 Claims, 3 Drawing Sheets

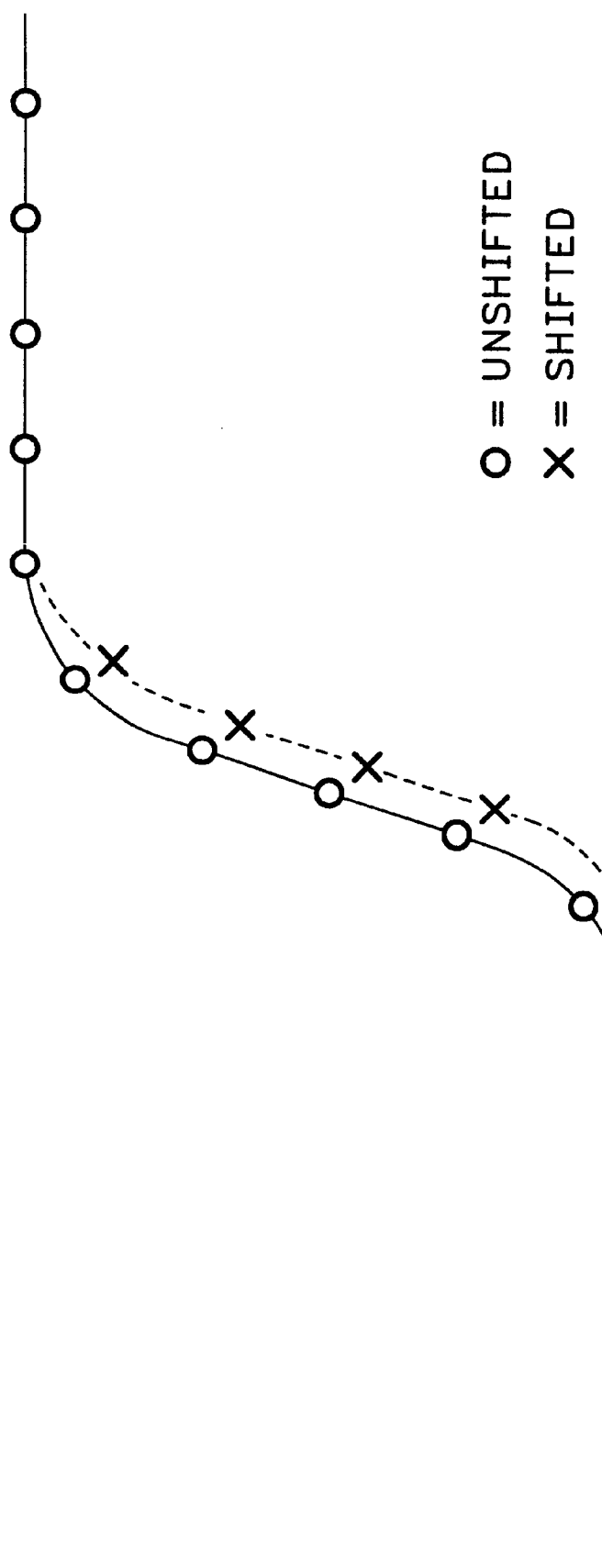

HIGH PRECISION IMAGE ALIGNMENT DETECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to digital video test and measurement, and more particularly to high precision image alignment detection for the registration of two images.

Conventional measurement of video signals occurs in the analog, broadband domain using conventional waveform monitors and vectorscopes. As video signals move into the digital domain, using serial digital formats and compression, the digital signals are conventionally converted into the analog, broadband domain for typical video measurements. However, especially with compressed video signals, there are additional requirements on the measurement of video signals since an important aspect of compression/decompression techniques is to assure a controlled level of picture quality degradation, i.e., the decompressed video signal presents the expected quality of display related to the video signal prior to compression.

The PQA200 Picture Quality Analysis System, manufactured by Tektronix, Inc. of Wilsonville, Oreg., is a programmable instrument for automatic measurement of compressed video quality, and is described in allowed U.S. patent application Ser. No. 08/605,241 filed Feb. 12, 1996 by Bozidar Jenko et al. The PQA200 adds stripes and registry marks to the active video portion of the video signal so that, when the video signal is compressed and then decompressed, the images in the received, decompressed video signal may be aligned with the corresponding images in the video signal prior to compression. The precision of this alignment process is important to provide the most accurate determination of picture quality.

What is desired is a high precision image alignment detection technique to assure that corresponding images to be measured for picture quality are aligned to provide the most accurate determination of picture quality.

BRIEF SUMMARY OF THE INVENTION

Accordingly the present invention provides high precision image alignment detection for providing high precision registration of two corresponding images. The detection is a four stage process, with the first two stages being used to locate an alignment pattern in a received image by cross-correlation with a reference image corresponding to the alignment pattern. This detects an integer pixel shift +/−0.5 pixel. Selected lines from the received alignment pattern are then used together with the reference image to perform a part pixel shift determination in the next two stages. The first of these stages determines an initial part pixel shift, and then the final stage does a fine part pixel shift determination in an iterative manner using a cross-correlation to redetermine the integer pixel shift and successive shifts and measurements based upon prior measurements to refine the part pixel shift as accurately as desired. The final pixel shift, which represents the misalignment between the received image and the reference image, is the sum of the integer pixel shift and the part pixel shift.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 3 illustrates the shifting of the image using interpolation for high precision image alignment detection according to the present invention.

DETAILED DESCRIPTION OF THE INVENTION

In the PQA200 a received video sequence is compared with an original video sequence to determine picture quility, i.e., how much the received video sequence has been degraded by video processing and transmission from the original video sequence. The alignment detection described herein is based upon images that have an inserted alignment detection pattern, such as that described in the U.S. Patent Application by Bozidar Jenko et al referenced above. The detection works on images that are horizontally shifted as well as vertically shifted, with the shift in both directions being detected with a very high precision. For the purpose of explanation only horizontal shift detection is described below.

Figure 1A:
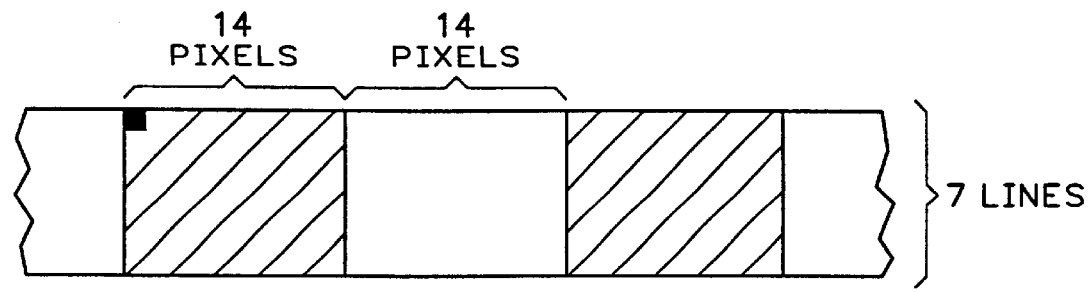
FIG. 1A represents an alignment pattern.
Figure 1B:
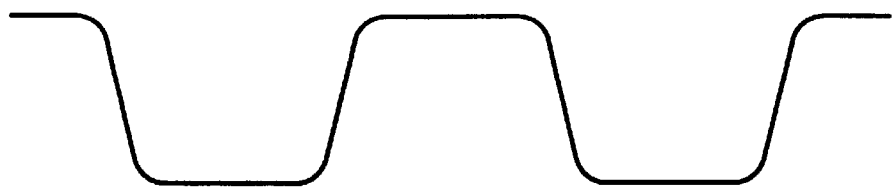
FIG. 1B represents a waveform for a line of the alignment pattern.

The high precision image alignment detection contains multiple stages, with a very high precision partial pixel detection done by a successive iteration algorithm in the last stage. The detection requires access to a reference image (an image from the original video sequence or corresponding to it exactly) or a portion of it, such as a single line. For example if a known alignment pattern is inserted into the original video sequence, the reference image may be generated at the measurement instrument to correspond exactly to the inserted alignment pattern. Such an alignment pattern may be seven lines in height with alternating black and white blocks, with the black blocks being 14 pixels wide from edge to edge horizontally, as shown in FIG. 1A, and the edges being softened to fulfill Nyquist criteria, as shown in FIGS. 1B, C and D. The pattern may also be amplitude modulated such that the values for the black and white blocks increase for each block in fine increments from one end of a line of the pattern to the other.

The first two stages serve to locate the alignment pattern within the received image, with the first stage of shift detection being a rough pixel detection stage. Due to the fact that an image may be shifted in a wide range, a relatively large part of the image is searched for the alignment pattern. A cross-correlation is performed over a region of the image where the alignment pattern is expected to appear. The cross-correlation starts at the beginning of the region and may skip every other or every third line to detect one of the lines of the alignment pattern in the received image. The best match is represented by the highest sum of the cross-correlations. If several points show the same results, the point with the lowest line number (highest position on the screen) is used. When there is no match at all, this means that there is no image or no alignment pattern inserted into the image. In this case the detection process is terminated.

The next stage is medium pixel detection, which is basically the same as the rough pixel detection. The differences are (1) the region to be searched is smaller, and (2) the result of the cross-correlation is taken from a larger portion of the image, for example over all the lines of the alignment pattern. This is only done when a match was found in the rough pixel detection stage. The best match is represented by the highest sum of the cross-correlations. This result is precise enough to detect the exact line number and good enough to detect horizontal pixel position with an accuracy of +/−0.5 pixel. The pixel in the first line of the alignment pattern corresponding to the start of the pattern iteration is located in this manner.

Figure 1C:
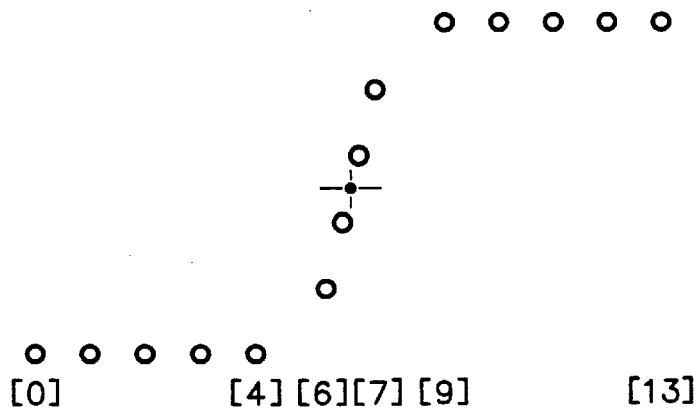
FIG. 1C represents data points taken about a rising edge of the alignment pattern.
Figure 1D:
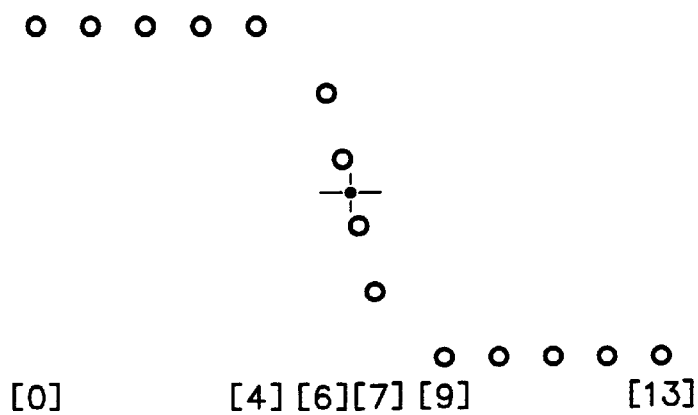
FIG. 1D represents data points taken about a falling edge of the alignment pattern to illustrate high precision image alignment detection according to the present invention.
Figure 2:
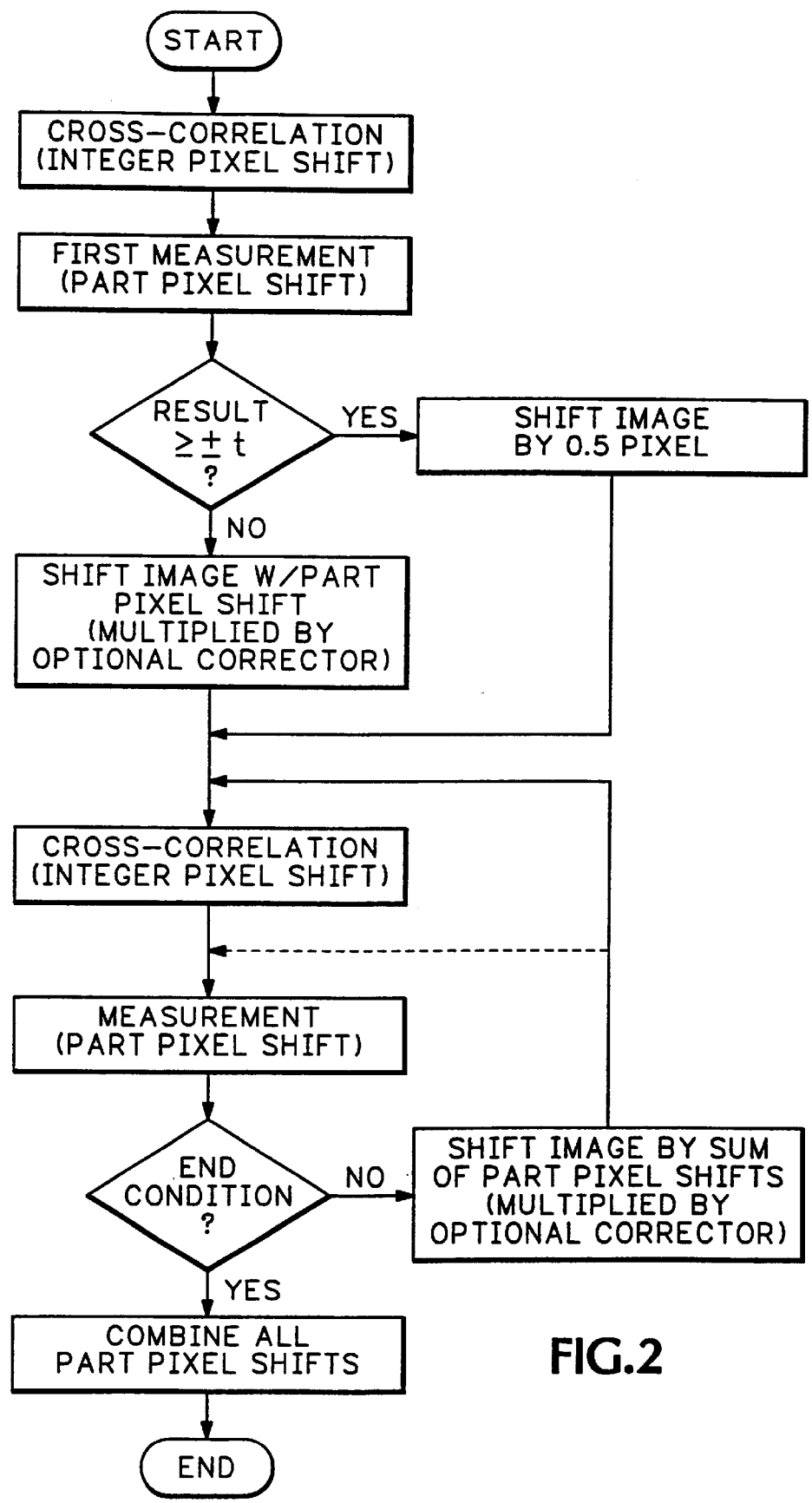
FIG. 2 is a flow chart block diagram view of the high precision image alignment detection according to the present invention.

The next two stages serve to precisely detect a part pixel shift of the received image, with the first of these stages being partial pixel detection. As shown in FIG. 2 the cross-correlation from the locating stages provides an integer pixel shift. This integer pixel shift is used to locate the data from the image that is centered on a significant Jeature of the alignment pattern, such as a rising and/or falling edge. The information to detect the part pixel shift may be calculated from the ramps representing the edges of the alignment squares in the alignment pattern, as shown in FIGS. 1C and D. For robustness not all of the lines of the pattern need be used for the measurements, i.e., only the inner lines of the multiple lines of the alignment pattern may be used. Whatever lines are selected, whether all or only some, they are maintained in an image register. A buffer register stores the values of a group of pixels surrounding both the rising and falling edges of the alignment blocks, with fourteen being shown for the sake of illustration. For each edge the pixel values are accumulated in the buffer register for each pixel location, such as 0 through 13 as shown. Ideally as shown in FIGS. 1C and D for precise alignment a value midway between pixels 6 and 7 in the buffer should be achieved. The shift for the rising edge is equal to the average of the 14 values in the buffer less the value of pixel 6 divided by the difference between pixels 7 and 6, i.e., shift_r=(avg_r−[6])/([7]−[6]). Likewise for the falling edge the shift is equal to the average of the 14 values in the buffer less the value of pixel 7 divided by the difference between pixels 6 and 7, i.e., shift_f=(avg_f−[7])/([6]−[7]). The total shift for the image equals the shift for the rising edge less the complement of the shift for the falling edge divided by two, i.e., shift=shift_r−(1−shift_f). A part pixel shift is equal to the difference between the shift value and 0.5, i.e., part pixel shift=shift−0.5.

Although this part pixel detection stage is robust, even in images of poor quality, there may be two uncertainties: (1) the cross-correlation has problems at the points of +/−0.5 pixel shift and may completely fail, i.e., the detection of one entire pixel may be wrong; and (2) within the range of less than +/−0.1 pixel shift the precision of the detection is high and becomes less at higher shift values, i.e., may be only +/−0.33 at a shift value of +/−0.5.

Due to these potential uncertainties, especially the potential for complete failure of the cross-correlation, an ultra fine part pixel detection stage using successive iteration is added. Continuing in FIG. 2 the first measurement value for the part pixel shift is compared with a threshold such as +/−0.33 and, if the threshold is exceeded, the image is shifted by 0.5 pixel, otherwise the image is shifted by the part pixel shift multiplied by an optional corrector which is greater than one, such as 1.5. The optional multiplier corrector is used to reduce the number of iterations required by achieving convergence to an accurate shift of 0.5 pixel more quickly.

Shifting of the image, as illustrated in FIG. 3, is performed by interpolation, using an appropriate filter such as a linear or sinx/x filter. For each part pixel shift value an appropriate lookup table, for example, may be accessed to provide filter coefficients for the interpolation. Alternatively the filter coefficients may be calculated for each part pixel shift value. The image from the image register is interpolated and loaded into a shifted register as the shifted image. The measurements are done on the image in the shifted register.

Another cross-correlation is done on the image in the shift register to redetermine the integer pixel shift, and another measurement is performed upon the shifted image with the data values being extracted according to the integer pixel shift. If a specified end condition is not achieved, such as a specified number of iterations or the size of the measurement being less than a specified threshold, again the image is shifted from the image register to the shifted register by the value from the sum of the prior measurements, multiplied by another optional corrector. The cross-correlation and measurement are performed, and this process repeats until the end condition is met. The cross-correlation may be omitted in this iteration loop, as the integer pixel shift should not change. The final shift value for the image is the sum of all of the measurement values for the part pixel shift plus the integer pixel shift.

As an example if an image is shifted by 3.7 pixels, the first three stages produce a +4 pixel shift (integer) minus a 0.3 pixel shift (part pixel). However the actual measurement from the third stage may actually detect a part pixel shift value of −0.22. The final ultra fine part pixel detection is performed on the −0.22 pixel. At each iteration the shift is performed on the originally stored received image, i.e., from the image register into the shifted register via interpolation. In other words already shifted lines of the image are not shifted again. The integer pixel shifts are determined by the cross-correlation, as discussed above, and the part pixel shift is determined by the above discussed iterative process. For example the part pixel shift resulted from a measured shift value of 0.28. The image is shifted by −0.22 and the measurement is retaken. The resulting part pixel shift value may then be −0.06 for a total part pixel shift of −0.28. The image is shifted by −0.28 and the measurement taken again. The part pixel shift value may now be −0.017. If this is sufficient accuracy, the final part pixel shift total is −0.297 so that the actual image shift is determined to be +3.703.

When the optional multiplier corrector, which for each iteration may be different but is preferably in the range between 1.1 and 1.5, is used for the above example, the −0.22 value is corrected by a 1.45 multiplier, for example, to be −0.319. The image from the image register is shifted into the shifted register by −0.319 and another measurement is taken. If the new measurement is +0.015, that measurement is multiplied by another corrector, such as 1.35, to be +0.02025. This is added to the prior corrected measurement to produce a new shift value of −0.29875. Another shift and measurement may produce a value of −0.0025. If the end conditions are met, this measurement is added to the prior sum to produce the final part pixel shift of −0.30125, and a total pixel shift of 3.69875.

Although a specific pattern was used for illustration, any known pattern, including a variable frequency pattern or one taken from the image itself, may be used. Although only the data from one of the edges may be used to perform the measurements of the part pixel shift, due to the fact that the alignment pattern may be modulated, as indicated above, or due to asymmetrical processing of the opposing edges, using the data from both edges results in a more precise result For the high precision part pixel shift.

Thus the present invention provides high precision image alignment detection by locating an alignment pattern in a received image using cross-correlation with a reference image corresponding to the alignment pattern, providing an integer pixel shift that is within +/−0.5 pixel, and then detecting through an iterative process a precise value for the part pixel shift.

What is claimed is:

1. A method of high precision image alignment detection for registering an image with a reference image comprising the steps of:

locating a multiple line alignment pattern in the image by cross-correlation with a reference image corresponding to the alignment pattern; and iteratively detecting a precision part pixel shift value for the image using data points from the image determined by an integer pixel shift value achieved by cross-correlation of the reference image and a portion of the located alignment pattern from the image, the data points being measured to determine an initial part pixel shift value and each successive iteration being performed on the data points for the image as shifted by the sum of the part pixel shift values from prior iterations until the precision part pixel shift value is achieved according to specified end conditions.

2. The method as recited in claim 1 wherein the locating step comprises the steps of:

cross-correlating the image with the reference image, the image having the alignment pattern inserted therein and the reference image corresponding to one line of the alignment pattern, to locate an approximate initial point of the alignment pattern in the image; and cross-correlating the image with the reference image over a limited search area determined by the approximate initial point to select the central lines of the alignment pattern from the image as the image for processing by the detecting step.

3. The method as recited in claim 1 wherein the detecting step comprises the steps of:

cross-correlating selected lines of the alignment pattern from the image with the reference image to determine the integer shift pixel value;

measuring a selected series of data points centered on specific features of the alignment pattern from the image, the data points being selected as a function of the integer shift pixel value, to determine the initial part pixel shift value;

shifting the selected lines of the alignment pattern according to the initial part pixel shift value by interpolation;

repeating the measuring and shifting steps, the shifting step in each iteration being a function of the total of the part pixel shift values for all prior iterations starting with the initial part pixel shift value, until a specified end condition is achieved, the sum of all iterations being the precision part pixel shift value.

4. The method as recited in claim 3 wherein the detecting step further comprises the step of multiplying the total part pixel shift values from the prior iterations by a corrector value prior to shifting the selected lines of the alignment pattern in the shifting step.

5. The method as recited in claims 3 or 4 wherein the detecting step further comprises the steps of:

shifting the selected lines of the alignment pattern by one-half pixel if the initial part pixel shift value exceeds a specified threshold; and cross-correlating the selected lines of the alignment pattern for the image as shifted by the first iteration of the shifting step with the reference image to redetermine the integer pixel shift value prior to the first iteration of the measurement step.

6. The method as recited in claim 5 wherein the detecting step further comprises the step of cross-correlating the selected lines of the alignment pattern from the image as shifted by each subsequent iteration of the shifting step with the reference image to redetermine the integer pixel shift value prior to each subsequent iteration of the measuring step.

* * * * *